(12) United States Patent
Xu

(10) Patent No.: US 11,521,305 B2
(45) Date of Patent: Dec. 6, 2022

(54) IMAGE PROCESSING METHOD AND DEVICE, MOBILE TERMINAL, AND STORAGE MEDIUM

(71) Applicant: BEIJING XIAOMI MOBILE SOFTWARE CO., LTD., Beijing (CN)

(72) Inventor: Jing Xu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 229 days.

(21) Appl. No.: 17/008,242

(22) Filed: Aug. 31, 2020

(65) Prior Publication Data
US 2021/0304370 A1 Sep. 30, 2021

(30) Foreign Application Priority Data
Mar. 31, 2020 (CN) .......................... 202010243546.5

(51) Int. Cl.
*G06T 5/00* (2006.01)
*G06T 5/50* (2006.01)
(Continued)

(52) U.S. Cl.
CPC ............... *G06T 5/006* (2013.01); *G06T 5/50* (2013.01); *G06V 10/56* (2022.01); *H04N 9/646* (2013.01); *H04N 9/73* (2013.01)

(58) Field of Classification Search
CPC . G06T 5/006; G06T 5/50; G06T 2207/10004; G06T 2207/10024;
(Continued)

(56) References Cited

U.S. PATENT DOCUMENTS 9,014,504 B2 4/2015 Lim et al.
9,769,430 B1 * 9/2017 Bechtel .................. H04N 9/045
(Continued)

FOREIGN PATENT DOCUMENTS

CN 104427267 A * 3/2015 ............. H04N 5/217
CN 107103589 A * 8/2017 ............. G06T 5/005
(Continued)

OTHER PUBLICATIONS

Extended European Search Report in the European Application No. 20195158.9, dated Feb. 26, 2021, (35p).
(Continued)

*Primary Examiner* — Jose L Couso
(74) *Attorney, Agent, or Firm* — Arch & Lake LLP

(57) ABSTRACT

Provided are an image processing method and device, a mobile terminal, and a storage medium. The method includes: acquiring a first image output by an image sensor; responsive to that a first signal value of the first image after being processed exceeds a saturation value of a first bit width at a preset image processing stage, recording the first signal value of the processed first image as a second signal value with a second bit width, the second bit width being greater than the first bit width; and mapping the second signal value recorded with the second bit width to a third signal value recorded with the first bit width to obtain a second image. Through the method, an operation of increasing a bit width can be used to retain more information of an image and improve the quality of the image, and an implementation is simple and effective.

17 Claims, 3 Drawing Sheets

(51) Int. Cl.
*H04N 9/64* (2006.01)
*H04N 9/73* (2006.01)
*G06V 10/56* (2022.01)

(58) Field of Classification Search
CPC . G06T 2207/20012; G06T 2207/20208; G06T 5/008; G06T 5/005; G06T 5/009; G06T 7/90; G06T 5/007; G06T 5/20; G06T 5/001; G06V 10/56; G06V 10/22; G06V 10/255; H04N 9/646; H04N 9/73; H04N 9/64; H04N 5/23229; H04N 9/67; H04N 9/735; H04N 5/2355; H04N 9/045; H04N 2209/046; H04N 9/643; H04N 9/68; H04N 9/0451; H04N 9/04515; H04N 9/04517; H04N 9/04555; H04N 9/04561; G06K 9/2054; G06K 9/2063

See application file for complete search history.

(56) References Cited

U.S. PATENT DOCUMENTS

| | | | | |
|---|---|---|---|---|
| 10,607,324 | B2* | 3/2020 | Farrell | G06T 7/90 |
| 10,755,062 | B1* | 8/2020 | Spitz | G06T 7/90 |
| 2006/0238655 | A1* | 10/2006 | Chou | H04N 9/68 |
| | | | | 348/E9.04 |
| 2008/0292206 | A1* | 11/2008 | Dvir | G06T 5/009 |
| | | | | 382/274 |
| 2012/0294527 | A1* | 11/2012 | Lukac | H04N 9/646 |
| | | | | 382/167 |
| 2013/0235070 | A1* | 9/2013 | Webb | G09G 5/02 |
| | | | | 715/764 |
| 2013/0321679 | A1* | 12/2013 | Lim | H04N 9/04557 |
| | | | | 348/E9.053 |
| 2016/0366386 | A1* | 12/2016 | Douady-Pleven | G06T 5/50 |
| 2018/0007332 | A1* | 1/2018 | Lim | G06T 5/008 |
| 2019/0260978 | A1* | 8/2019 | Guérin | H04N 5/232 |
| 2020/0077066 | A1* | 3/2020 | Cao | H04N 9/735 |
| 2020/0389585 | A1* | 12/2020 | Liu | H04N 5/2351 |

FOREIGN PATENT DOCUMENTS

| | | | | |
|---|---|---|---|---|
| CN | 107103589 | A | 8/2017 | |
| CN | 105023249 | B | 11/2017 | |
| CN | 108353125 | A | 7/2018 | |
| CN | 110009588 | A | 7/2019 | |
| CN | 110365949 | A | 10/2019 | |
| GB | 2519336 | A * | 4/2015 | G06T 5/001 |
| TW | 200803532 | A * | 1/2008 | H04N 5/20 |
| WO | WO-2008027840 | A1 * | 3/2008 | H04N 5/2351 |
| WO | WO-2020250163 | A1 * | 12/2020 | G06T 5/50 |

OTHER PUBLICATIONS

Arora, Shaveta, et al., "Enhancement of Overexposed Color Images", 2015 3rd International Conference on Information and Communication Technology (ICOICT), IEEE, May 27, 2015, (5p).

Gupta, Sunit et al., "Effective Restoration of Clipped Pixels in LDR Images", 2013 International Conference on Communication and Signal Processing, IEEE, Apr. 3, 2013, (4p).

First Office Action of the Chinese Application No. 202010243546.5, dated Mar. 22, 2022 with English translation, (16p).

* cited by examiner

IMAGE PROCESSING METHOD AND DEVICE, MOBILE TERMINAL, AND STORAGE MEDIUM

CROSS-REFERENCE TO RELATED APPLICATION

This application is based upon and claims priority to Chinese Patent Application No. 202010243546.5, filed on Mar. 31, 2020, the entire contents of which are incorporated herein by reference.

TECHNICAL FIELD

The present disclosure generally relates to the technical field of image processing, and more particularly, to an image processing method and device, a mobile terminal, and a storage medium.

BACKGROUND

In the field of computer vision and pattern recognition, the highlight of an image brings difficulties and challenges to implementation effects of many applications. Highlight is actually a very common phenomenon in real scenes, which is the change of the color and brightness of an object surface caused by the change of illumination at different viewing angles and reflects the optical reflection characteristics of the object surface. In digital images, highlight each pixel often have high brightness, and thus cover the color, contour or texture of the object surface. Saturated highlight directly leads to the loss of local area information, so highlight is usually regarded as a defect in the image.

SUMMARY

The present disclosure provides an image processing method and device, a mobile terminal, and a storage medium.

According to a first aspect of the present disclosure, an image processing method is provided. The method may be applied to a mobile terminal, and may include: acquiring a first image output by an image sensor; responsive to that a first signal value of the first image after being processed exceeds a saturation value of a first bit width at a preset image processing stage, recording the first signal value of the processed first image as a second signal value with a second bit width, the second bit width being greater than the first bit width; and mapping the signal value recorded with the second bit width to a third signal value recorded with the first bit width to obtain a second image.

According to a second aspect of the present disclosure, an image collection device is provided. The device may be applied to a mobile terminal, and may include a processor and a memory configured to store instructions executable by the processor. The processor is configured to acquire a first image output by an image sensor; responsive to that a first signal value of the first image after being processed exceeds a saturation value of a first bit width at a preset image processing stage, record the first signal value of the processed first image as a second signal value with a second bit width, the second bit width being greater than the first bit width; and map the signal value recorded with the second bit width to a third signal value recorded with the first bit width to obtain a second image.

According to a third aspect of the present disclosure, a non-transitory computer-readable storage medium is provided. When instructions in the storage medium are executed by a processor of a mobile terminal, the mobile terminal can be caused to implement the image processing method as described in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
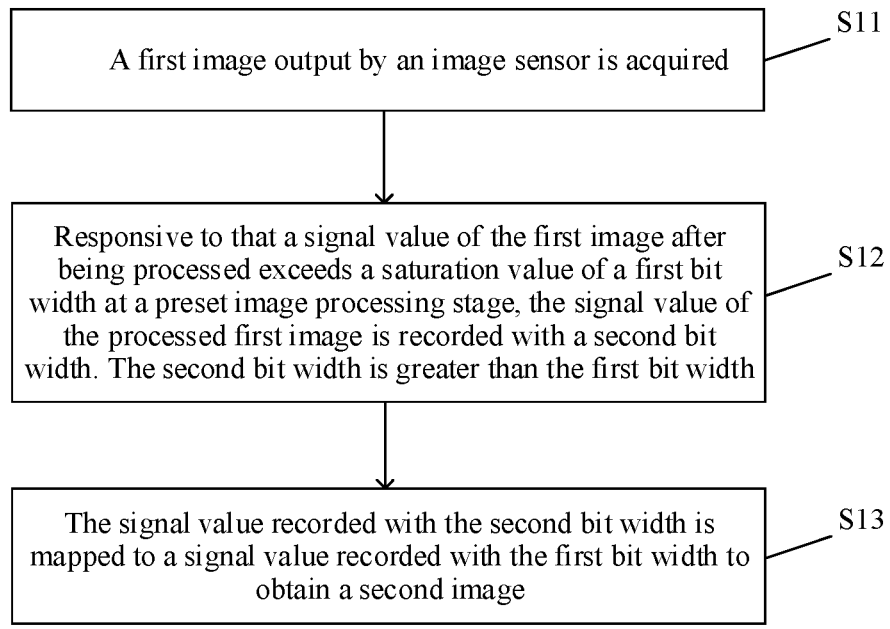
FIG. 1 is a flowchart showing an image processing method according to an embodiment of the present disclosure.

FIG. 1 is a flowchart showing an image processing method according to an embodiment of the present disclosure. As shown in FIG. 1, an image processing method applied to a mobile terminal includes the following operations.

In S11, a first image output by an image sensor is acquired. The first image may include first image signal values with a first bit width. The first image signal values may be raw image signals.

In S12, responsive to that a first signal value of the first image after being processed exceeds a saturation value of a first bit width at a preset image processing stage, the first signal value of the processed first image is recorded as a second signal value with a second bit width. The second bit width is greater than the first bit width.

In S13, the second signal value recorded with the second bit width is mapped to a third signal value recorded with the first bit width to obtain a second image.

In the embodiments of the present disclosure, the mobile terminal can be a mobile phone, a tablet computer, a camera, a smart wearable device, or the like. The mobile terminal may include an image collection module, such as a front camera or a rear camera in a mobile phone, which may perform image collection.

In operation S11, the first image is an image output by a sensor. For example, the first image may be an image output by a sensor in the image collection module. During the output, the sensor has a fixed bit width, which may be understood as a first bit width, such as 8 bits. A supported dynamic range is 0 to 255. Due to the limitation of a dynamic range of the sensor itself, a brightness value exceeding the dynamic range may be truncated to a saturation value of 255.

Generally, the image output by the sensor needs to be subjected to preset image processing. The preset image processing is also called Image Signal Processing (ISP). The ISP can complete the effect processing of digital images through a series of digital image processing algorithms, including black level correction, white balance correction, lens shading correction, demosaicing, color space conversion, denoising, global tone mapping, local tone mapping, brightening, sharpening, and other operations. Due to the limitation of a data bit width, a signal that is not saturated at the output of the image sensor may also exceed the saturation value after the ISP.

The lens shading correction is taken as an example. When the lens shading correction is performed, the center of an image is taken as an origin, a distance between each pixel and the center of the image is taken as a radius, and the pixel is multiplied by a corresponding gain to offset the uneven brightness caused by the optical characteristics of a lens. The gain value of the center of the image is 1, and the gain values of other positions are greater than 1. Based on the introduction of a gain in the lens shading correction, the unsaturated signal may exceed the saturation value after correction processing.

The white balance correction is taken as an example. In the white balance correction, a green channel is taken as a reference, and a red channel and a blue channel may be multiplied by corresponding gains to achieve uniform brightness of the three color channels. The gain of the green channel is 1, and the gains of the red channel and the blue channel are greater than 1. It can be seen that, based on the introduction of a gain in the white balance correction, the unsaturated signal may exceed the saturation value after correction processing.

In this regard, in operation S12 of the present disclosure, when the signal value of the processed first image exceeds the saturation value of the first bit width, the signal value of the processed first image may be recorded with a second bit width that is greater than the first bit width. That is, when image processing is performed on the first image, if the signal value exceeds the saturation value of the first bit width, truncation processing may be not performed, but the bit width may be increased to the second bit width for output to retain a truncated signal.

For example, the first bit width may be 8 bits, the second bit width may be 9 bits, and the supported dynamic range can be 0 to 511. After image processing is performed on the first image, if the signal value exceeds 255, the second bit width may be used for recording. It should be noted that the second bit width is not limited to 9 bits, and the appropriate second bit width may be formulated according to a data storage capacity of the mobile terminal itself, so that signals exceeding the saturation value of the first bit width may be recorded without truncation.

In an embodiment, the image processing may include at least one of:
  lens shading correction; and
  white balance correction.

In this embodiment, as described above, due to image processing modes such as lens shading correction and white balance correction, the unsaturated signal may exceed the saturation value after correction processing. However, it should be noted that the image processing modes in which the unsaturated signal exceeds the saturation value due to image processing are not limited to lens shading correction and white balance correction, and include, for example, brightness increasing processing and the like.

It should be noted that, generally, a larger signal value of an image indicates larger brightness, and a large-brightness area is called a highlight area or a high-brightness area. Therefore, a part of the signal value of the first image after image processing, which exceeds the saturation value of the first bit width, also belongs to the highlight area. The highlight area part is likely to lose original detail information of an object (such as color, contour or texture), and the saturation value of the highlight area directly loses local area information. Therefore, in the present disclosure, in order to retain information belonging to the highlight area, a part of the saturation value that exceeds the first bit width after image processing is recorded with the second bit width.

However, considering the operations of subsequent processing modules, for example, the display of images in the mobile terminal, etc., the signal value after being increased to the second bit width is needed to be compressed to the original first bit width (that is, bit width compression). Therefore, in operation S13 of the embodiments of the present disclosure, the signal value recorded with the second bit width may be mapped to the signal value recorded with the first bit width to obtain a second image that retains the information of the highlight area (that is, highlight restoration).

There are two main technologies for performing highlight restoration on images. The first technology is multi-frame processing. By controlling the exposure time of different frames, different exposure images of the same area can be acquired. For highlight areas under normal exposure (such as the sky and neon lights), highlight recovery can be achieved by fusing color and detail information of corresponding areas under underexposure conditions (such as underexposure thumbnail images). The second technology is single-frame processing. Intrinsic image decomposition may be performed on a light reflective area by estimating a light reflection model of the highlight area, and diffuse reflection components and intrinsic reflection information may be separated by integrating local area features to achieve the purpose of repairing the highlight area.

However, with respect to the first solution, first, since the reference is an underexposed thumbnail, the thumbnail needs to be interpolated to have the same size as a normally exposed image. However, the interpolation process may bring errors, which may further cause information recovery errors, thereby affecting the recovery effect of the highlight area. Second, the processing of multi-frame images may have a problem of image alignment. Without image alignment, the global position of two frames of images may be offset, and if there are moving objects in the images, local alignment cannot be guaranteed. Third, since the mobile terminal needs to collect multiple frames of images and process the multiple frames of images, the data processing load of the mobile terminal may be relatively heavy, making the mobile terminal consume more power.

In addition, with respect to the second solution, since the light reflection model only deals with a phenomenon of an image that smooth objects reflects light, all the highlight areas, such as the sky and neon lights, cannot be processed, so the restoration effect is limited.

In the present disclosure, at an image processing stage, information that may be lost can be recorded with a simple operation of increasing a bit width, and the original first bit width can be mapped back for subsequent operations while more information is retained. On the one hand, there is no need for a mobile terminal to collect multiple frames of images and perform processing based on the multiple frames of images, thus lowering the power consumption of the mobile terminal and reducing the occurrence of bad restoration effect caused by alignment processing or interpolation processing on the multiple frames of images. On the other hand, a mode of increasing a bit width is not limited by an image scene. Compared with a mode of using a light reflection model to perform intrinsic image decomposition, the solutions of the present disclosure are more universal.

In an embodiment, operation S12 may include that:

the signal value recorded with the second bit width is mapped to the signal value recorded with the first bit width according to a maximum signal value of different color components of each pixel of an image recorded with the first bit width after image processing to obtain a third image;

different color sub-signal values of each pixel recorded with the second bit width are mapped to the signal value recorded with the first bit width based on the first image before image processing to obtain a fourth image; and the second image is obtained based on the third image and the fourth image.

In this embodiment, mapping may be performed according to the maximum signal value of different color components of each pixel of the image recorded with the first bit width after image processing. Since a maximum signal value of different color components reflects the brightness of images, for example, in an HSV space, a value (V) of an image refers to a maximum value of red pixels (R), green pixels (G), and blue pixels (B) in the image, it can be understood that when mapping is performed according to the maximum signal value of different color components of each pixel of the image recorded with the first bit width after image processing, the recovery of brightness during image correction can be achieved. The restoration of brightness may reflect the contour and/or texture of the image, so detailed information may be restored based on the recovery of brightness.

In this embodiment, based on the first image before image processing, different color sub-signal values of each pixel recorded with the second bit width can be mapped to the signal value recorded with the first bit width. The first image is an image output by the sensor, that is, a collected original image. For example, a three-channel ratio value that has not reached the saturation value in the collected original image can truly reflect a color, so the color can be restored based on the first image.

According to the third image that recovers the details and the fourth image that restores the color, the second image that recovers both the details and the color may be obtained, so the quality of the obtained image is better.

In an embodiment, both the third image and the fourth image may be images of an RGB space. The operation that the second image is obtained based on the third image and the fourth image may include that:

the third image is converted to an HSV space to obtain a first HSV space image;

the fourth image is converted to the HSV space to obtain a second HSV space image; and corresponding values in the RGB space are acquired according to a value of a value V channel in the first HSV space image, and a value of a hue H channel and a value of a saturation S channel in the second HSV space image, and the second image is obtained.

In this embodiment, in order to obtain the second image that recovers both the details and the color, brightness information of the third image and color-related information in the fourth image are used. In the HSV space, the value of the value (V) channel reflects brightness, so the third image is converted to the first HSV space to obtain the value of the V channel. Hue (H) in the HSV space reflects hue, and saturation (S) reflects the saturation of a color in a hue space, which is the information of the reflected color, so the fourth image is converted to the second HSV space to obtain the values of the H channel and the V channel.

According to the value of the V channel obtained from the third image, the values of the H channel and the S channel obtained from the fourth image may be inversely transformed into the RGB space to obtain a second image with both brightness and color restored.

It can be understood that, in this embodiment, based on the recovery of the brightness and the restoration of the color separately, a full range of recovery can be achieved.

In an embodiment, the operation that the signal value recorded with the second bit width is mapped to the signal value recorded with the first bit width according to a maximum signal value of different color components of each pixel of an image recorded with the first bit width after image processing to obtain a third image may include that:

a first part, greater than a preset threshold, of the maximum signal value of different color components of each pixel recorded with the second bit width is mapped to a range between the preset threshold and the saturation value of the first bit width; and a second part, less than or equal to the preset threshold, of the maximum signal value of different color components of each pixel recorded with the second bit width is mapped to match with a part, less than or equal to the preset threshold, of the maximum signal value of different color components of each pixel of the image recorded with the first bit width after image processing to obtain the third image.

In this embodiment, after image processing is performed on the first image, the image recorded with the first bit width refers to an image after a signal exceeding the saturation value of the first bit width is truncated with the saturation value of the first bit width, for example, recorded as SrcC. When the signal value of the processed first image exceeds the saturation value of the first bit width, the image recorded with the second bit width is recorded as SrcU.

In the present disclosure, when mapping is performed according to the image recorded with the first bit width after image processing, it can be understood that, in a part less than or equal to the saturation value of the first bit width, different color component signal values of the each pixel of SrcC and SrcU are consistent, and differ only in a part greater than the saturation value of the first bit width. Therefore, when mapping is performed on the basis of the maximum signal value of different color components of each pixel to obtain a brightness-recovered third image, before the mapping, in the part less than or equal to the saturation value of the first bit width, the maximum signal value of different color components of each pixel is consistent, while the maximum signal value of different color components of each pixel is different in the part greater than the saturation value of the first bit width.

Figure 2:
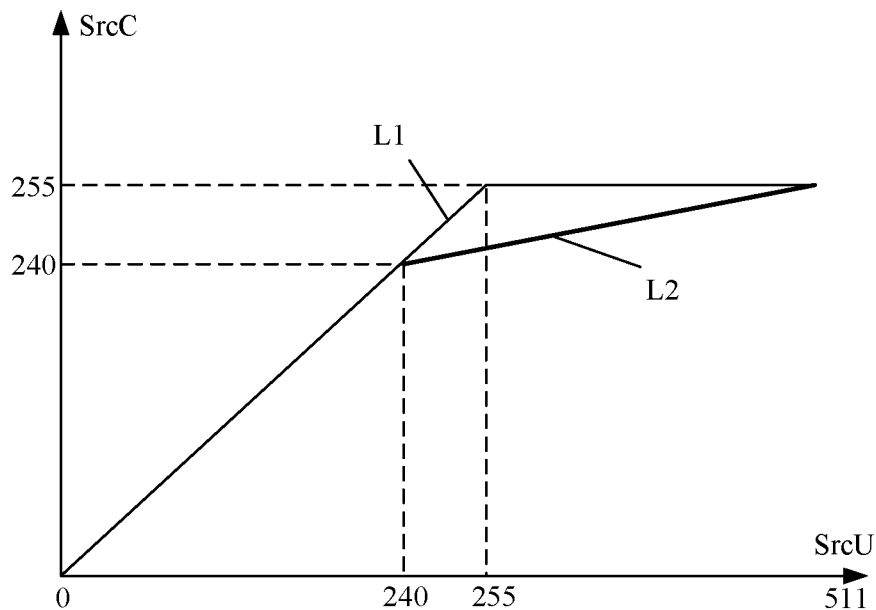
FIG. 2 is a first example diagram of a mapping relationship in an embodiment of the present disclosure.

For example, the first bit width may be 8 bits and the second bit width may be 9 bits. FIG. 2 is a first example diagram of a mapping relationship in an embodiment of the present disclosure. As shown in FIG. 2, the ordinate represents a maximum value of different color components of each pixel point of SrcC, and the abscissa represents a maximum value of different color components of each pixel point of SrcU. In FIG. 2, before the mapping processing of SrcU in the present disclosure is performed, a curve of a mapping relationship between SrcU and SrcC is recorded as L1. As can be seen from FIG. 2, in a part less than or equal to 255, the maximum value of different color components of each pixel point of SrcC is consistent, the mapping relationship is linear, and the slope is 1. For SrcC, since the part that exceeds the saturation value is truncated by 255, the mapping relationship is expressed as a straight line with a value of 255 in a part with the maximum value of different color components of each pixel point of SrcU exceeding 255.

In the present disclosure, in order to recover the detailed information of the highlighted area, L1 needs to be modified. In this regard, a brightness threshold Thresh to be recovered is set in the present disclosure, that is, a preset threshold. The preset threshold represents the set brightness area that needs to be recovered. For example, if the Thresh value is 240, the set highlight area to be recovered is 241 to 255, so that a part exceeding 240 of the maximum signal value of different color components of each pixel recorded with the second bit width may be mapped to a range between 241 and 255.

Exemplarily, as shown in FIG. 2, L2 is an example curve of mapping. In L2, the part (second part) less than or equal to the preset threshold (240) of the maximum signal value of different color components of each pixel of SrcU is consistent with the part less than or equal to 240 of the maximum signal value of different color components of each pixel of SrcC. The part (first part) greater than 240 of the maximum signal value of different color components of each pixel of SrcU is mapped to a range between 241 and 255, and the slope of the brightness mapping curve of this part is tan ((255−Thresh)/(511−Thresh)).

It should be noted that when the first part, greater than the preset threshold, of the maximum signal value of different color components of each pixel recorded with the second bit width is mapped to a range between the preset threshold and the saturation value of the first bit width, the slope of the mapping curve is not limited to: a ratio between the value of the saturation value of the first bit width minus the preset threshold and the value of the saturation value of the second bit width minus the preset threshold. For example, a non-linear mapping mode may also be used. However, it can be understood that, by adopting the slope linear mapping mode, the gradient of the brightness value recorded with the second bit width can be used to maintain the recovery of the brightness gradient, thereby making the brightness recovery effect more realistic.

It can be understood that when the signal value recorded with the second bit width is mapped to the signal value recorded with the first bit width according to a maximum signal value of different color components of each pixel of an image recorded with the first bit width after image processing to obtain a third image, the above mode of the present disclosure is adopted. On the one hand, the second part is kept consistent with the first image, and it can be ensured that the operation of mapping from the second bit width to the first bit width (bit width compression) cannot change the brightness of the processed image. On the other hand, the brightness recovery of the highlight area is more controllable and smarter based on the control of the preset threshold.

In an embodiment, the method may further include that:
a smooth-curve-shape mapping relationship is obtained based on the mapping of the first part between the preset threshold and the saturation value of the first bit width and the mapping of the second part to the part, less than or equal to the preset threshold, of the maximum signal value of different color components of each pixel of the image recorded with the first bit width after image processing.

The operation that the signal value recorded with the second bit width is mapped to the signal value recorded with the first bit width according to a maximum signal value of different color components of each pixel of an image recorded with the first bit width after image processing to obtain a third image may include that:
a maximum signal value of different color components of each pixel recorded with the second bit width is mapped to the signal value recorded with the first bit width according to the smooth-curve-shape mapping relationship to obtain the third image.

In this embodiment, in order to avoid the phenomenon that the changed brightness mapping curve causes an unnatural transition in the image, fitting may be performed based on the mapping of the first part and the mapping of the second part to obtain a smooth-curve-shape mapping relationship. For example, the fitting mode may use polynomial fitting, least square fitting, etc. The embodiments of the present disclosure do not limit the fitting method for obtaining the smooth-curve-shape mapping relationship.

In the present disclosure, after performing fitting, a maximum signal value of different color components of each pixel recorded with the second bit width may be mapped to the signal value recorded with the first bit width according to the fitted smooth-curve-shape mapping relationship to obtain a third image that is excessively natural after brightness recovery.

In an embodiment, the operation that different color sub-signal values of each pixel recorded with the second bit width are mapped to the signal value recorded with the first bit width based on the first image before image processing to obtain a fourth image may include that:
a first pixel having different color sub-signal values all less than the saturation value of the first bit width is determined among each pixel of the first image;
a second pixel corresponding to the first pixel is determined among each pixel recorded with the second bit width;
a third part having a color sub-signal value greater than the saturation value of the first bit width is determined from the second pixel; and
different color sub-signal values of each pixel recorded with the second bit width are mapped to the signal value recorded with the first bit width based on the third part to obtain the fourth image.

In this embodiment, the first image before image processing is an image originally output by the image sensor. As mentioned above, in the signals output by the image sensor, the three-channel ratio of an output signal that has not reached the saturation value can truly reflect the color, and when the signal output by the image sensor reaches saturation, the three-channel ratio of the output signal cannot reflect the true color. Therefore, in the embodiments of the present disclosure, the first image (for example, recorded as SrcS) may be used to map different color sub-signal values of each pixel of the signal value recorded with the second bit width to the signal value recorded with the first bit width to obtain a color-recovered fourth image. An image corresponding to the signal value recorded with the second bit width is recorded as SrcU, for example.

Specifically, a first pixel having different color sub-signal values all less than the saturation value of the first bit width can be first determined among each pixel of the first image (SrcS). In this operation, different color sub-signal values of each pixel in SrcS may be scanned point by point, and whether different color sub-signal values are all less than the saturation value of the first bit width (for example, 255) can be determined.

For example, assuming that different color sub-signal values of each pixel of the signal (SrcS) output by the image sensor are R0, G0, and B0, the maximum value of R0, G0, and B0 may be first acquired as maxRGB0, and whether maxRGB0 is less than 255 may be determined.

Further, a second pixel corresponding to the first pixel needs to be determined among the pixels (SrcU) recorded with the second bit width, and a third part (belonging to the highlight area) having a color sub-signal value greater than the saturation value of the first bit width needs to be determined from the second pixel to map, based on the third part, different color sub-signal values of each pixel recorded with the second bit width to the signal value recorded with the first bit width to obtain a fourth image for recovering the color of the highlight area.

For example, it is assumed that different color sub-signal values of each pixel point of the image (SrcU) that is subjected to image processing and recorded with the second bit width are R, G, and B. In the second pixel corresponding to the first pixel, the maximum value of R, G, and B may be first acquired as maxRGB, it may be determined whether maxRGB is greater than 255, and the second pixel having maxRGB greater than 255 is recorded as the third part.

It can be understood that the first pixel may be determined from the pixels of the first image, the third part for color recovery may be divided from the signal values recorded with the second bit width according to the first pixel, and then different color sub-signal values of each pixel recorded with the second bit width may be mapped to the signal value recorded with the first bit width based on the third part to obtain a color-recovered fourth image. The accuracy of color recovery can be improved.

It should be noted that when bit width compression mapping is performed based on the third part, the pixels belonging to the third part and the pixels other than the third part among the pixels recorded with the second bit width need to be mapped in different ways.

In an embodiment, the operation that different color sub-signal values of each pixel recorded with the second bit width are mapped to the signal value recorded with the first bit width based on the third part to obtain the fourth image may include that:

different color sub-signal values of each pixel of the third part are compressed proportionally to a range not exceeding the saturation value of the first bit width; and color sub-signal values of pixels, other than the third part, recorded with the second bit width, which are greater than a color sub-signal value of the saturation value of the first bit width, are mapped to the saturation value of the first bit width to obtain the fourth image.

In this embodiment, since the third part belongs to a part capable of color recovery, different color sub-signal values of each pixel of the third part may be compressed proportionally to a range not exceeding the saturation value of the first bit width to retain the true color. Exemplarily, when the third part is compressed proportionally by color, the code is as follows:

if maxRGB0<Sat
if maxRGB>Sat $d=Sat/maxRGB;$ $R=R^*(1-a)+R^*d^*a;$ $G=G^*(1-a)+G^*d^*a;$ $B=B^*(1-a)+B^*d^*a;$ In this part, Sat is the saturation value of the first bit width, d and a are compression coefficients, the value of d is less than 1, and the value of a is less than or equal to 1. d is the ratio of the saturation value of the first bit width to the maximum value of a current pixel in the third part, and a may be an S-shaped mapping curve. By means of the above mapping, different color sub-signal values of each pixel of the third part can be compressed proportionally to a range not exceeding the saturation value of the first bit width.

Figure 3:
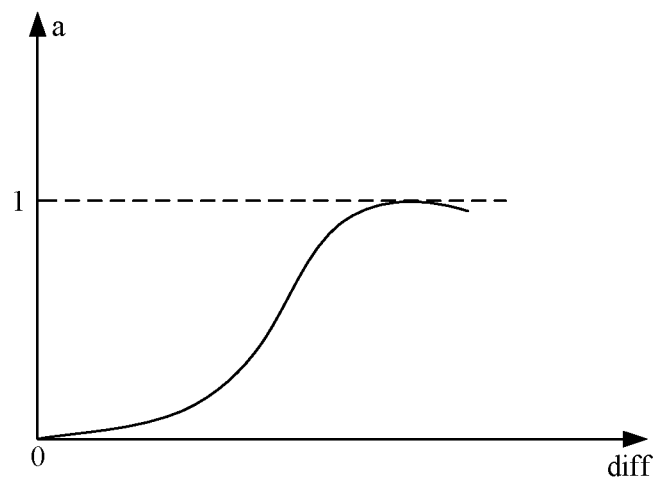
FIG. 3 is a second example diagram of a mapping relationship in an embodiment of the present disclosure.

FIG. 3 is a second example diagram of a mapping relationship in an embodiment of the present disclosure. The mapping relationship diagram is a value mapping diagram of a. As shown in FIG. 3, the ordinate is the value of a, the abscissa diff refers to a difference between the saturation value (Sat) of the first bit width and the maximum value maxRGB0 of different color sub-signal values of each pixel point of the first image, the value of a is related to the value of diff, and the value of a changes dynamically.

It can be understood that, when the proportional compression mapping is performed for different color sub-signal values of each pixel of the third part, the above dynamic proportional compression mode according to the present pixel situation can improve the accuracy of color recovery of the highlight area. In addition, in this embodiment, color sub-signal values, greater than the saturation value of the first bit width, in different color sub-signal values of each of the pixels other than the third part can be directly mapped to the saturation value of the first bit width. The mapping mode is also relatively simple.

It should be noted that, in this embodiment, color sub-signal values, less than or equal to the saturation value of the first bit width, in different color sub-signal values of each of the pixels other than the third part may be kept unchanged.

Figure 4:
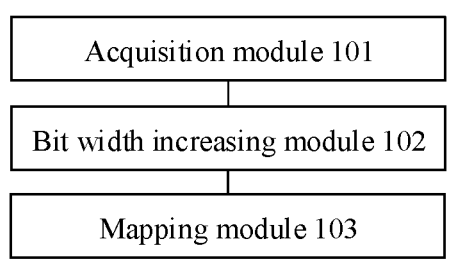
FIG. 4 is a diagram illustrating an image processing device according to an exemplary embodiment.

FIG. 4 is a diagram illustrating an image processing device according to an exemplary embodiment. Referring to FIG. 4, the image collection device includes:

an acquisition module 101, configured to acquire a first image output by an image sensor;

a bit width increasing module 102, configured to, responsive to that a signal value of the first image after being processed exceeds a saturation value of a first bit width at a preset image processing stage, record the signal value of the processed first image with a second bit width, the second bit width being greater than the first bit width; and a mapping module 103, configured to map the signal value recorded with the second bit width to a signal value recorded with the first bit width to obtain a second image.

Optionally, the mapping module 103 may include a first mapping module 103A, a second mapping module 103B, and an obtaining module 103C.

The first mapping module 103A is configured to, according to a maximum signal value of different color components of each pixel of an image recorded with the first bit width after image processing, map the signal value recorded with the second bit width to the signal value recorded with the first bit width to obtain a third image.

The second mapping module 103B is configured to, based on the first image before image processing, map different color sub-signal values of each pixel recorded with the second bit width to the signal value recorded with the first bit width to obtain a fourth image.

The obtaining module 103C is configured to obtain the second image based on the third image and the fourth image.

Optionally, the first mapping module 102A is specifically configured to map a first part, greater than a preset threshold, of the maximum signal value of different color components of each pixel recorded with the second bit width between the preset threshold and the saturation value of the first bit width; and map a second part, less than or equal to the preset threshold, of the maximum signal value of different color components of each pixel recorded with the second bit width to match with a part, less than or equal to the preset threshold, of the maximum signal value of different color components of each pixel of the image recorded with the first bit width after image processing to obtain the third image.

Optionally, the device may further include:

a smoothing module 104, configured to obtain a smooth-curve-shape mapping relationship based on the mapping of the first part between the preset threshold and the saturation value of the first bit width and the mapping of the second part to the part, less than or equal to the preset threshold, of the maximum signal value of different color components of each pixel of the image recorded with the first bit width after image processing.

The first mapping module 103A is specifically configured to, according to the smooth-curve-shape mapping relationship, map a maximum signal value of different color components of each pixel recorded with the second bit width to the signal value recorded with the first bit width to obtain the third image.

Optionally, the second mapping module 103B is specifically configured to determine, among each pixel of the first image, a first pixel having different color sub-signal values all less than the saturation value of the first bit width; determine, among each pixel recorded with the second bit width, a second pixel corresponding to the first pixel; determine, from the second pixel, a third part having a color sub-signal value greater than the saturation value of the first bit width; and map, based on the third part, different color sub-signal values of each pixel recorded with the second bit width to the signal value recorded with the first bit width to obtain the fourth image.

Optionally, the second mapping module 103B is specifically configured to proportionally compress different color sub-signal values of each pixel of the third part to a range not exceeding the saturation value of the first bit width; and map color sub-signal values of pixels, other than the third part, recorded with the second bit width, which are greater than a color sub-signal value of the saturation value of the first bit width, to the saturation value of the first bit width to obtain the fourth image.

Optionally, the obtaining module 103C is specifically configured to convert the third image to an HSV space to obtain a first HSV space image; convert the fourth image to the HSV space to obtain a second HSV space image; and acquire corresponding values in the RGB space according to a value of a value V channel in the first HSV space image, and a value of a hue H channel and a value of a saturation S channel in the second HSV space image, and obtain the second image.

Optionally, the image processing may include at least one of:

lens shading correction; and
white balance correction.

With respect to the devices in the above embodiments, the specific manners for performing operations for individual modules therein have been described in detail in the embodiments regarding the methods, which will not be elaborated herein.

Figure 5:
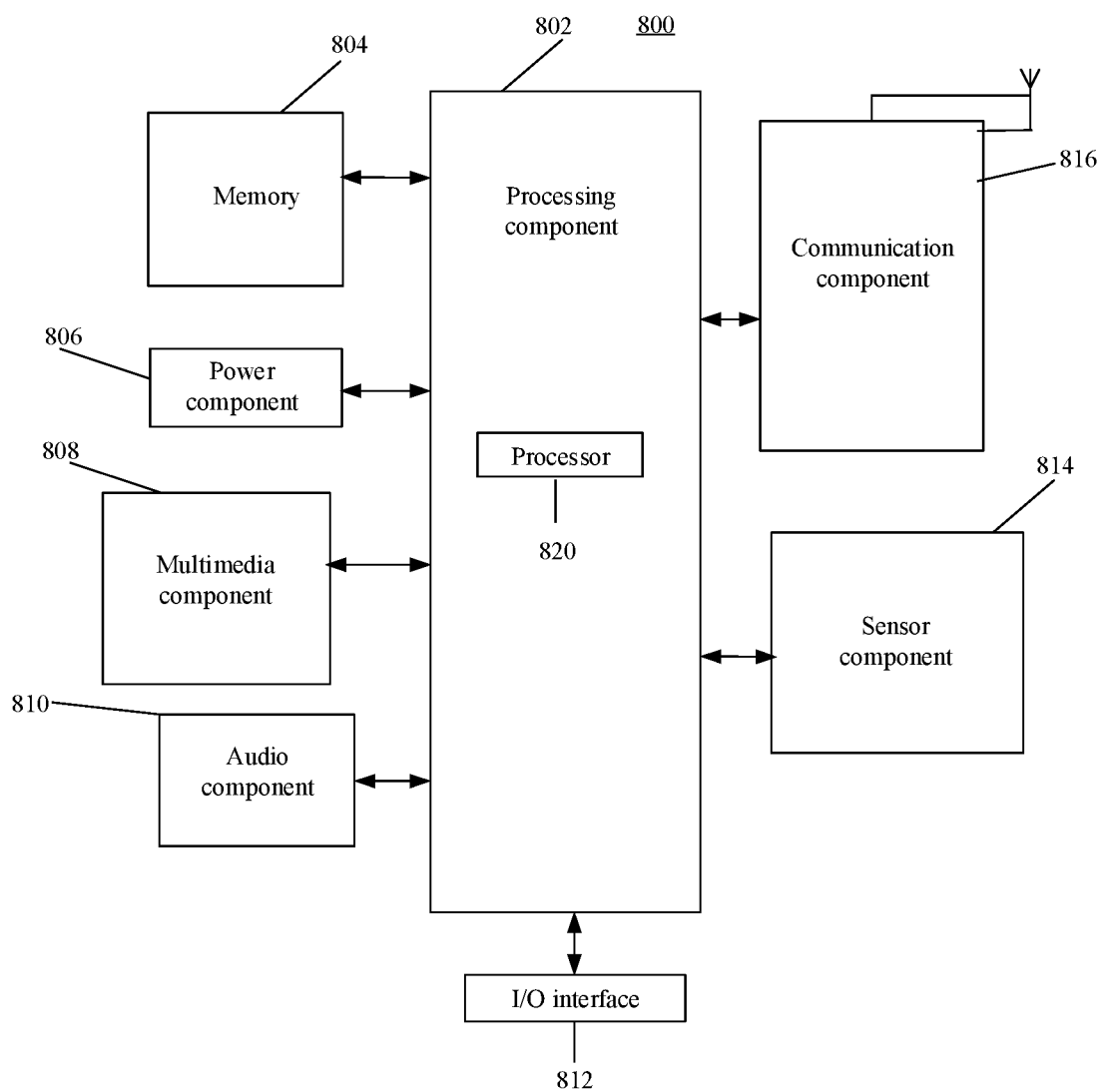
FIG. 5 is a block diagram illustrating a mobile terminal according to an embodiment of the present disclosure.

FIG. 5 is a block diagram illustrating a mobile terminal device 800 according to an exemplary embodiment. For example, the device 800 may be a mobile phone, a camera, etc.

Referring to FIG. 5, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as operations associated with display, telephone calls, data communications, camera operations, and recording operations. The processing component 802 may include one or more processors 820 for executing instructions to complete all or part of the operations in the described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support operations at the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the device 800. The power component 806 may include: a power management system, one or more power sources, and any other components associated with the generation, management and distribution of power in the device 800.

The multimedia component 808 includes a screen providing an output interface between the device 800 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or may have focusing and optical zooming capabilities.

The audio component 810 is configured to output and/or input audio signals. For example, the audio component 810 includes a Microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting the audio signal.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors to provide status assessments of various aspects of the device 800. For example, the sensor component 814 may detect an open/closed status of the device 800, and relative positioning of components. For example, the component is the display and the keypad of the device 800. The sensor component 814 may also detect a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on a communication standard, such as Wi-Fi, 2G or 3G, or a combination thereof. In one exemplary embodiment, the communication component 816 receives a broadcast signal or broadcast associated information from an external broadcast management system via a broadcast channel. In an exemplary embodiment, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary embodiments, there is also provided a non-transitory computer-readable storage medium including instructions, such as included in the memory 804, executable by the processor 820 of the device 800 to complete the above described method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

A non-transitory computer-readable storage medium is provided. When instructions in the storage medium are executed by a processor of a mobile terminal, the mobile terminal is caused to perform a control method. The method include:

acquiring a first image output by an image sensor;

responsive to that a signal value of the first image after being processed exceeds a saturation value of a first bit width at a preset image processing stage, recording the signal value of the processed first image with a second bit width, the second bit width being greater than the first bit width; and mapping the signal value recorded with the second bit width to a signal value recorded with the first bit width to obtain a second image.

In the embodiments of the present disclosure, during image processing of a first image output by a sensor, when a signal value of the first image after being processed exceeds a saturation value of a first bit width, the signal value of the first image may be recorded with a second bit width, that is, information that may be lost can be recorded with a simple bit width increasing operation, and the original first bit width can be mapped back for subsequent operations while more information is retained. On the one hand, there is no need for a mobile terminal to collect multiple frames of images and perform processing based on the multiple frames of images to restore the information that may be lost, thus lowering the power consumption of the mobile terminal and reducing the occurrence of bad restoration effect caused by alignment processing or interpolation processing on the multiple frames of images. On the other hand, a mode of increasing a bit width is not limited by an image scene. Compared with a mode of performing intrinsic image decomposition with a light reflection model for highlight repair, the solutions of the present disclosure are more universal.

It may further be understood that "a plurality of" in the present disclosure refers to more or more than two, and other quantifiers are the same. The "and/or" is an association relationship for describing associated objects and represents that three relationships may exist. For example, A and/or B may represent the following three cases: only A exists, both A and B exist, and only B exists. The character "/" generally indicates that the related objects are in an "or" relationship. "A/an", "said" and "the" in a singular form are also intended to include a plural form, unless other meanings are clearly denoted throughout the present disclosure.

It is further to be understood that, although terms "first", "second" and the like may be adopted to describe various information, the information should not be limited to these terms. These terms are only adopted to distinguish the information of the same type rather than represent a special sequence or an importance. As a matter of fact, the terms "first", "second" and the like may be interchangeable completely. For example, without departing from the scope of the present disclosure, first information may also be called second information and, similarly, second information may also be called first information.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for image processing, implemented by a mobile terminal, the method comprising:
    acquiring a first image output by an image sensor;
    responsive to that a first signal value of the first image after being processed exceeds a saturation value of a first bit width at a preset image processing stage, recording the first signal value of the processed first image as a second signal value with a second bit width, wherein the second bit width is greater than the first bit width; and
    mapping the second signal value recorded with the second bit width to a third signal value recorded with the first bit width to obtain a second image,
    wherein mapping the second signal value recorded with the second bit width to the third signal value recorded with the first bit width to obtain the second image comprises:
        mapping, according to a maximum signal value of different color components of each pixel of an image recorded with the first bit width after image processing, the second signal value recorded with the second bit width to the third signal value recorded with the first bit width to obtain a third image;
        mapping, based on the first image before image processing, different color sub-signal values of each pixel recorded with the second bit width to the third signal value recorded with the first bit width to obtain a fourth image; and
        obtaining the second image based on the third image and the fourth image.

2. The method according to claim 1, wherein the mapping, according to a maximum signal value of different color components of each pixel of an image recorded with the first bit width after image processing, the second signal value recorded with the second bit width to the third signal value recorded with the first bit width to obtain a third image comprises:
    mapping a first part, greater than a preset threshold, of the maximum signal value of different color components of each pixel recorded with the second bit width to a range between the preset threshold and the saturation value of the first bit width; and
    mapping a second part, less than or equal to the preset threshold, of the maximum signal value of different color components of each pixel recorded with the second bit width to match with a part, less than or equal to the preset threshold, of the maximum signal value of different color components of each pixel of the image recorded with the first bit width after image processing to obtain the third image.

3. The method according to claim 2, further comprising:
    obtaining a smooth-curve-shape mapping relationship based on the mapping of the first part to the range between the preset threshold and the saturation value of the first bit width and the mapping of the second part to the part, less than or equal to the preset threshold, of the maximum signal value of different color components of each pixel of the image recorded with the first bit width after image processing,
    wherein the mapping, according to a maximum signal value of different color components of each pixel of an image recorded with the first bit width after image processing, the second signal value recorded with the second bit width to the third signal value recorded with the first bit width to obtain a third image comprises:
        mapping, according to the smooth-curve-shape mapping relationship, the maximum signal value of different color components of each pixel recorded with the second bit width to the third signal value recorded with the first bit width to obtain the third image.

4. The method according to claim 1, wherein the mapping, based on the first image before image processing, different color sub-signal values of each pixel recorded with the second bit width to the third signal value recorded with the first bit width to obtain a fourth image comprises:
  determining, among each pixel of the first image, a first pixel having different color sub-signal values all less than the saturation value of the first bit width;
  determining, among each pixel recorded with the second bit width, a second pixel corresponding to the first pixel;
  determining, from the second pixel, a third part having a color sub-signal value greater than the saturation value of the first bit width; and
  mapping, based on the third part, different color sub-signal values of each pixel recorded with the second bit width to the third signal value recorded with the first bit width to obtain the fourth image.

5. The method according to claim 4, wherein the mapping, based on the third part, different color sub-signal values of each pixel recorded with the second bit width to the third signal value recorded with the first bit width to obtain the fourth image comprises:
  proportionally compressing different color sub-signal values of each pixel of the third part to a range not exceeding the saturation value of the first bit width; and
  mapping color sub-signal values of pixels, other than the third part, recorded with the second bit width, which are greater than a color sub-signal value of the saturation value of the first bit width, to the saturation value of the first bit width to obtain the fourth image.

6. The method according to claim 1, wherein both the third image and the fourth image are images of a red green blue (RGB) space;
  obtaining the second image based on the third image and the fourth image comprises:
    converting the third image to an HSV space to obtain a first HSV space image;
    converting the fourth image to the HSV space to obtain a second HSV space image; and
    acquiring corresponding values in the RGB space according to a value of a value V channel in the first HSV space image, and a value of a hue H channel and a value of a saturation S channel in the second HSV space image, and obtaining the second image.

7. The method according to claim 1, wherein the image processing comprises at least one of:
  lens shading correction; and
  white balance correction.

8. A device for image processing, implemented by a mobile terminal, the device comprising:
  a processor; and
  a memory configured to store instructions executable by the processor,
  wherein the processor is configured to
  acquire a first image output by an image sensor;
  responsive to that a first signal value of the first image after being processed exceeds a saturation value of a first bit width at a preset image processing stage, record the first signal value of the processed first image as a second signal value with a second bit width, the second bit width being greater than the first bit width; and
  map the second signal value recorded with the second bit width to a third signal value recorded with the first bit width to obtain a second image,
  wherein the processor is further configured to:
  map, according to a maximum signal value of different color components of each pixel of an image recorded with the first bit width after image processing, the second signal value recorded with the second bit width to the third signal value recorded with the first bit width to obtain a third image;
  map, based on the first image before image processing, different color sub-signal values of each pixel recorded with the second bit width to the third signal value recorded with the first bit width to obtain a fourth image; and
  obtain the second image based on the third image and the fourth image.

9. The device according to claim 8, wherein the processor is further configured to:
  map a first part, greater than a preset threshold, of the maximum signal value of different color components of each pixel recorded with the second bit width to a range between the preset threshold and the saturation value of the first bit width; and
  map a second part, less than or equal to the preset threshold, of the maximum signal value of different color components of each pixel recorded with the second bit width to match with a part, less than or equal to the preset threshold, of the maximum signal value of different color components of each pixel of the image recorded with the first bit width after image processing to obtain the third image.

10. The device according to claim 8, wherein the processor is further configured to:
  obtain a smooth-curve-shape mapping relationship based on the mapping of the first part to the range between the preset threshold and the saturation value of the first bit width and the mapping of the second part to the part, less than or equal to the preset threshold, of the maximum signal value of different color components of each pixel of the image recorded with the first bit width after image processing; and
  map, according to the smooth-curve-shape mapping relationship, a maximum signal value of different color components of each pixel recorded with the second bit width to the third signal value recorded with the first bit width to obtain the third image.

11. The device according to claim 8, wherein the processor is further configured to:
  determine, among each pixel of the first image, a first pixel having different color sub-signal values all less than the saturation value of the first bit width;
  determine, among each pixel recorded with the second bit width, a second pixel corresponding to the first pixel;
  determine, from the second pixel, a third part having a color sub-signal value greater than the saturation value of the first bit width; and
  map, based on the third part, different color sub-signal values of each pixel recorded with the second bit width to the third signal value recorded with the first bit width to obtain the fourth image.

12. The device according to claim 11, wherein the processor is further configured to:
  proportionally compress different color sub-signal values of each pixel of the third part to a range not exceeding the saturation value of the first bit width; and
  map color sub-signal values of pixels, other than the third part, recorded with the second bit width, which are greater than a color sub-signal value of the saturation value of the first bit width, to the saturation value of the first bit width to obtain the fourth image.

13. The device according to claim 8, wherein the processor is further configured to:

convert the third image to an HSV space to obtain a first HSV space image;

convert the fourth image to the HSV space to obtain a second HSV space image; and acquire corresponding values in the RGB space according to a value of a value V channel in the first HSV space image, a value of a hue H channel and a value of a saturation S channel in the second HSV space image, and obtain the second image.

14. The device according to claim 8, wherein the image processing comprises at least one of:

lens shading correction; and white balance correction.

15. A mobile terminal, comprising:

a display screen; and the device for image processing according to claim 8.

16. A non-transitory computer-readable storage medium, having stored instructions therein that, when executed by a processor of a mobile terminal, cause the mobile terminal to implement operations of:

acquiring a first image output by an image sensor;

responsive to that a first signal value of the first image after being processed exceeds a saturation value of a first bit width at a preset image processing stage, recording the first signal value of the processed first image as a second signal value with a second bit width, the second bit width being greater than the first bit width; and mapping the second signal value recorded with the second bit width to a third signal value recorded with the first bit width to obtain a second image, wherein mapping the second signal value recorded with the second bit width to the third signal value recorded with the first bit width to obtain the second image comprises:

mapping, according to a maximum signal value of different color components of each pixel of an image recorded with the first bit width after image processing, the second signal value recorded with the second bit width to the third signal value recorded with the first bit width to obtain a third image;

mapping, based on the first image before image processing, different color sub-signal values of each pixel recorded with the second bit width to the third signal value recorded with the first bit width to obtain a fourth image; and obtaining the second image based on the third image and the fourth image.

17. The non-transitory computer-readable storage medium of claim 16, wherein the mapping, according to a maximum signal value of different color components of each pixel of an image recorded with the first bit width after image processing, the second signal value recorded with the second bit width to the third signal value recorded with the first bit width to obtain a third image comprises:

mapping a first part, greater than a preset threshold, of the maximum signal value of different color components of each pixel recorded with the second bit width to a range between the preset threshold and the saturation value of the first bit width; and mapping a second part, less than or equal to the preset threshold, of the maximum signal value of different color components of each pixel recorded with the second bit width to match with a part, less than or equal to the preset threshold, of the maximum signal value of different color components of each pixel of the image recorded with the first bit width after image processing to obtain the third image.

* * * * *